United States Patent
Haddad (10) Patent No.: US 12,122,613 B2
(45) Date of Patent: Oct. 22, 2024

(54) DEVICE AND PROCESS FOR AUTOMATED LOADING AND UNLOADING OF PARCELS

(71) Applicant: HADDAD & CO S.A.L. (HOLDING COMPANY), Bikfaya (LB)

(72) Inventor: Antoine Haddad, Montreal (CA)

(73) Assignee: HADDAD & CO S.A.L., Bikfaiya (LB)

( * ) Notice: Subject to any disclaimer, the term of this patent is extended or adjusted under 35 U.S.C. 154(b) by 0 days.

(21) Appl. No.: 18/002,053

(22) PCT Filed: Jun. 23, 2020

(86) PCT No.: PCT/IB2020/055910
§ 371 (c)(1),
(2) Date: Dec. 16, 2022

(87) PCT Pub. No.: WO2021/260412
PCT Pub. Date: Dec. 30, 2021

(65) Prior Publication Data
US 2023/0227272 A1    Jul. 20, 2023

(51) Int. Cl.
*B65G 47/54* (2006.01)
*B65G 47/91* (2006.01)
*B65G 61/00* (2006.01)

(52) U.S. Cl.
CPC ............. *B65G 47/54* (2013.01); *B65G 47/91* (2013.01); *B65G 61/00* (2013.01)

(58) Field of Classification Search
CPC ........ B65G 57/24; B65G 57/22; B65G 67/00; B65G 57/10; B65G 67/04; B65G 67/08; B65G 67/20; B65G 61/00; B65G 67/10; B65G 47/54; B65G 47/91
See application file for complete search history.

(56) References Cited

U.S. PATENT DOCUMENTS

| | | |
|---|---|---|
| 5,718,325 A | 2/1998 | Doster |
| 6,439,631 B1 | 8/2002 | Kress |
| 9,725,257 B2 | 8/2017 | Schenning |
| 10,029,374 B2 | 7/2018 | McCollum et al. |
| 10,294,046 B2 | 5/2019 | Hart |
| 10,457,490 B2 | 10/2019 | Nakamoto et al. |

(Continued)

FOREIGN PATENT DOCUMENTS

DE    102010015299 A1 * 10/2011 ............ B65G 65/02
EP    1885636 B1    2/2008
(Continued)

*Primary Examiner* — Gregory W Adams (57) ABSTRACT

The invention relates to a device for assembling or disassembling rows of parcels such as boxes and stacking or de-stacking these rows of parcels into or from a space, such as a container. The device of the invention comprises a transport conveyor to maneuver goods from or to the space, a stacking conveyor (300) positioned adjacent to the transport conveyor to align the parcels in a row or to break up a row of parcels, a pusher system (500) associated with the stacking conveyor (300) to push the row of parcels of the stacking conveyor, a loading arm (200) for sending and/or receiving, for transferring and stacking the row of parcels pushed off the stacking conveyor (300) in the space or pick a row of parcels from the space and transfer this row of parcels to the stacking conveyor (300).

8 Claims, 7 Drawing Sheets

(56) References Cited

U.S. PATENT DOCUMENTS

| | | |
|---|---|---|
| 2011/0268548 A1 | 11/2011 | Doll |
| 2015/0063972 A1 | 3/2015 | Girtman |
| 2018/0050876 A1 | 2/2018 | Hart |
| 2018/0118476 A1* | 5/2018 | Bastian, II ............ B65G 41/001 |
| 2023/0227272 A1* | 7/2023 | Haddad .................. B65G 60/00 |
| | | 414/801 |

FOREIGN PATENT DOCUMENTS

| | | | |
|---|---|---|---|
| EP | 2805903 A1 * | 11/2014 | ............ B65G 59/04 |
| EP | 2805903 B1 | 11/2014 | |
| JP | 59163237 A * | 9/1984 | ............ B65G 67/02 |
| WO | 1998051598 A1 | 11/1998 | |

* cited by examiner

FIG. 8

DEVICE AND PROCESS FOR AUTOMATED LOADING AND UNLOADING OF PARCELS

FIELD OF THE INVENTION

The present disclosure relates generally to devices, automated and moveable, that load and unload shipping containers, and is more particularly directed to an autonomous loading and unloading of said containers. The innovation will be disclosed in connection with, but not necessarily limited to, the autonomous container loading and unloading.

BACKGROUND

Nowadays, goods/parcels travel all over the world, and even into space, by being stacked into appropriate containers for safe, secure and rapid transportation. The containers vary in size and but not so much in shape. These can be in the form of trucks, shipping containers used on cargo ships, shipping containers used on planes, and in the case of space shipping, containers use on space shuttles. Regardless of the size, material and destination, goods are stacked in the most efficient manner possible to maximize each cargo load. Maximizing the cargo load results in a much more efficient and cost-effective movement of goods from its point of origin to its destination.

There has been a number of advances from the days when such activities were considered manual labor and manpower was used to sort, arrange transport and stack goods in the most efficient manner. A number of solutions have been proposed and are being implemented which expedite the process, i.e. the ability to load and unload more than one package at a time, and which allow for an optimal use of the loading space, i.e. managing different sized/shaped packages.

The tasks of loading and unloading of containers have been addressed in a number of prior art documents. U.S. Pat. No. 9,725,257 discloses a device for handling stackable cargo units in a cargo space, as well as a method for handling stackable cargo units. The disclosed device comprises a movable arm with a head, comprising an array with downwardly directed gripping bodies (e.g. suction cups). According to the invention there is a second grip section with which the cargo units can be gripped at the sides thereof. Hereby also cargo units of a top row can be unloaded quickly. The invention also relates to a method for the loading/unloading of a cargo space. In '257, the loading and unloading may be achieved in 2 steps. The disclosure provides for a transport track on which goods can be transported towards the device for stacking or alternatively, where the unloaded goods can be placed for transporting away to a distal position for further processing.

US20180050876 discloses a loading and unloading machine for loading goods into, or unloading goods from a container. The loading and unloading machine has a goods conveyor extending into the container and configured to convey goods to or from the container, a transfer system located adjacent an end of the goods conveyor configured to maneuver goods from or to the loading machine into or from the container, respectively, and a height adjustment system configured to adjust the height of the transfer system to a desired height. However, it is not possible to load or unload a row of goods with the full width of the container due to the machine frame that induces a dead space around the machine edges. Furthermore, the parcels that are being loaded or unloaded should have the same size which will require a sorting process according to size before any action.

U.S. Pat. No. 10,029,374 discloses an autonomous truck loader and unloader. The said device comprises a mobile body, a robot arm and a body conveyor system to convey cartons during loading and unloading. A manipulator attaches to a moveable end of the robot arm and is maneuverable within the tight confines of the truck. The manipulator picks up a row of parcels at a first location and places the row of parcels down at a second location. The manipulator is reconfigurable to match to both locations. As described in '374, parcels in a row are loaded and unloaded in two separate tasks, allowing for loading and unloading on either side of the container or cargo space. In view of the configuration of the device disclosed in '374, the possibility of loading and unloading a full row at the same time is not possible due to restrictions in space within the cargo space or container.

In a further prior disclosure relating to this subject matter, WO 1998/051598 discloses a device for handling freight, especially in parcels, when loading and unloading a loading area. The invention pertains to a device and method for handling freight, especially parcels, when loading and unloading a loading area where the parcels are stacked so as to be accessed on a horizontal plane, involving a conveying system for transporting freight to or from the loading area. The invention is characterized in that at least one suction crampon device, which can be positioned in the horizontal plane of a parcel so as to be solidly and detachably gripped due to a sub-pressure exerted on one of its sides to be moved mainly in a horizontal plane; that a conveying system is provided to enable parcel freight to be transferred to or from the transport unit and that the suction crampon device moves each parcel individually, directly from the conveying system to the loading area or directly from the loading area to the conveying system. While the disclosure describes an efficient system for loading and loading combined with a transport system to and from a loading area, the efficiency of such a system is limited by the ability to simultaneously load/unload rows of parcels to be freighted while transporting other parcels.

While EP 2805903B1 relates to a device for unloading stacked objects, like boxes comprising conveyors and grippers, the invention does not solve the problem of the loading cycle. In addition to being only an unloading device, the invention does not cover the whole of the designated area, therefore, unloading a full row in one cycle is not possible.

EP 1885636B1 relates to a device for unloading stackable cargo units from a cargo space. Although the invention comprises a multitude of conveyors, grippers and a movable platform with parallel grippers, it is designed for the unloading cycle, it does not cover the full width of the container in one cycle and two cycles cannot be performed simultaneously. This raises the question, once more, of the available devices being time and space efficient.

Despite the presently existing devices, vehicles and solutions available, there is still the need to improve, optimize and accelerate the process of loading and unloading. The present invention proposes further solutions for executing on these tasks by disclosing an inventive process which is autonomous, adaptable and reconfigurable to any number of instances where loading and unloading of cargo spaces is required.

SUMMARY OF THE INVENTION

The following describes a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented hereinafter.

In one aspect of the proposed device of the invention is provided a simultaneous loading/unloading of parcels while still allowing for parcels to be transported to and from the device without the need for any changes or reprogramming in the process. In a loading process, it is the object of the present invention to allow for the transport of pre-sorted and pre-defined parcels to the device where a predefined number of parcels are aligned as they will be loaded into the loading area (e.g. container) to fill a full row at once. As this predefined row is being loaded to the proper row and column in the loading area, the next pre-sorted and pre-defined parcels of a predefined number of parcels are to be aligned are being transported during the stacking process, and ready to be aligned and stacked immediately and so on and so on forth.

In the same manner, in the unloading process, the device will remove a complete row from a predefined column and row. The complete row of parcels will then be transported away by taking advantage of the plurality of conveyors of the device also connected with the transport conveyor which will transport said parcels away from the loading/unloading area.

This is achieved by integrating in one device a plurality of conveyors, rollers, pushing arm, extending arm, grippers and suction elements. The conveyors further comprise the ability to extend and shorten to suit the needs of the stacking. The various components of the proposed device allow for stacking of complete rows regardless of the width of the loading area, starting from the first bottom row and all the way up to the top row without the need to necessarily allow for a pre-defined length of space between the top of the top row and the ceiling of the loading container.

The device further includes a sensing system (600) comprising plurality of sensors to be further described in more detail in the figures and description below. These said sensors are integrated with the process of loading and unloading to achieve the goals of improving, in a novel and inventive way, the rapid, efficient and optimal loading and unloading of freight containers or areas.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and inventive features of the innovation will become apparent from the following detailed description of the innovation when considered in conjunction with the drawings.

DETAILED DESCRIPTION

This innovation provides in one form a device for loading and/or unloading one or more rows of parcels into and/or from designated areas. What differs this invention from the prior art cited hereinabove is the time and space efficiency resulting from its process as it will be explained.

Unlike any other cited prior art, the device presented pre-organizes and compiles the parcels for loading. The feature of the 3rd conveyor and the pusher being able to extend their length in order to cover the full width of the designated area is both time and space efficient since it allows the device to load or unload a full row at one time. The time efficiency is emphasized by the split system for (a) preparing row for loading, and (b) stacking row; i.e. next row is being prepared while current row is being stacked. The same is applicable for the unloading cycle where the next row can be removed from stack while previous row is being conveyed to final unloading zone. Finally, time efficiency is clear once more when the unloading cycle is expedited by the use of the 2nd conveyor which angles the unloaded parcels which allows the unloading process to be faster.

Figure 1:
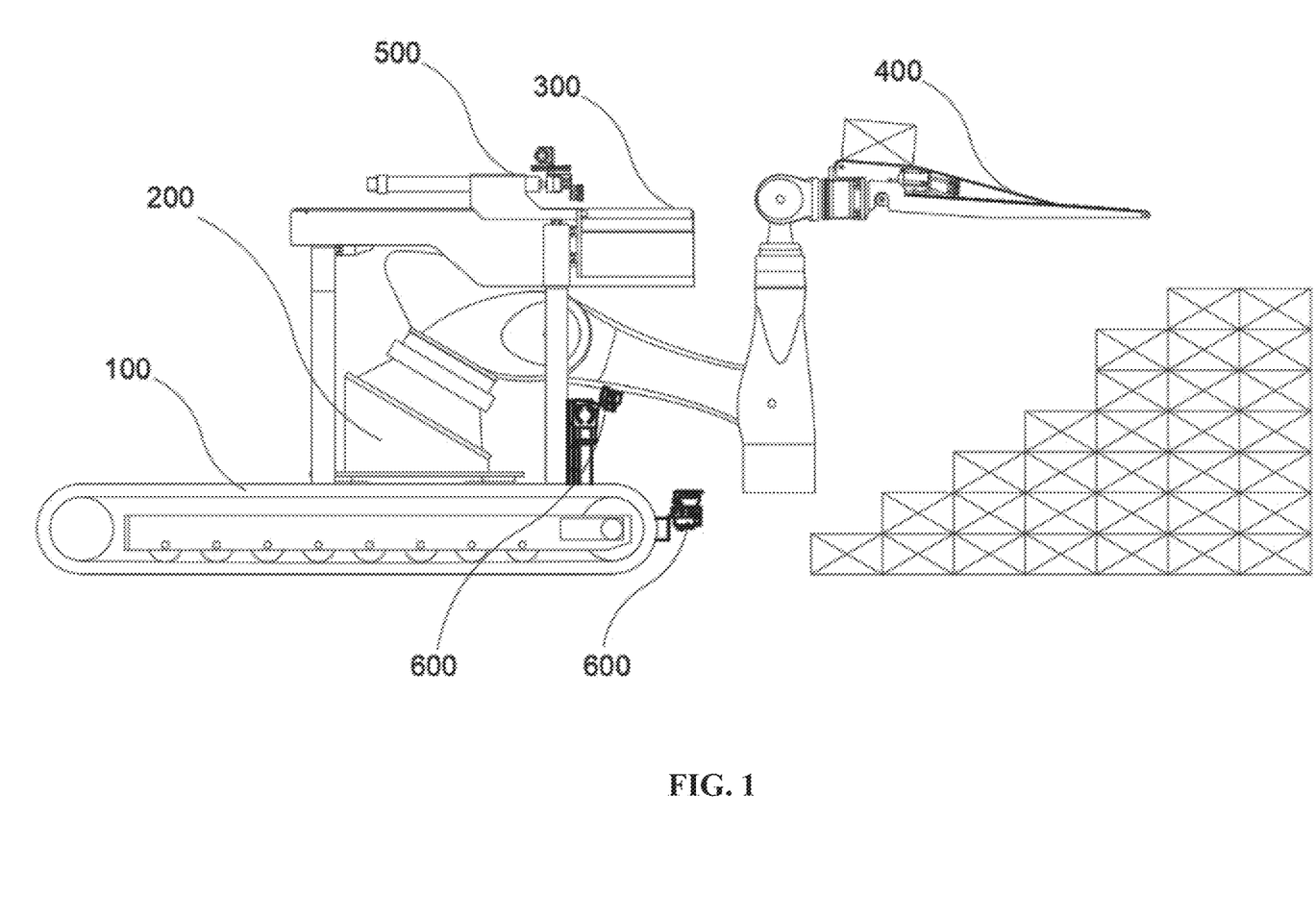
FIG. 1 illustrates a side perspective view of the loading/unloading device
Figure 2:
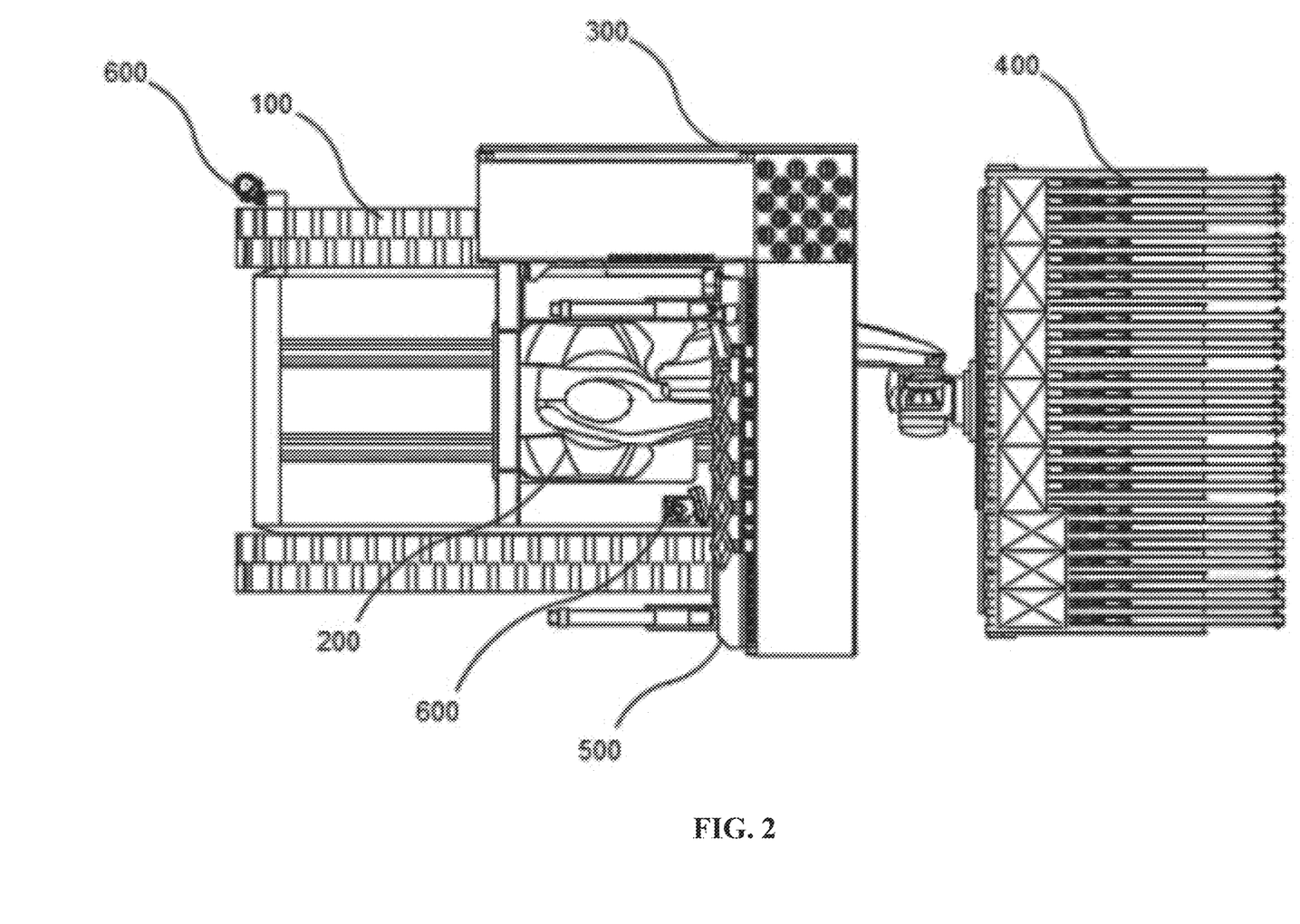
FIG. 2 illustrates a top plan view of the loading/unloading device
Figure 3:
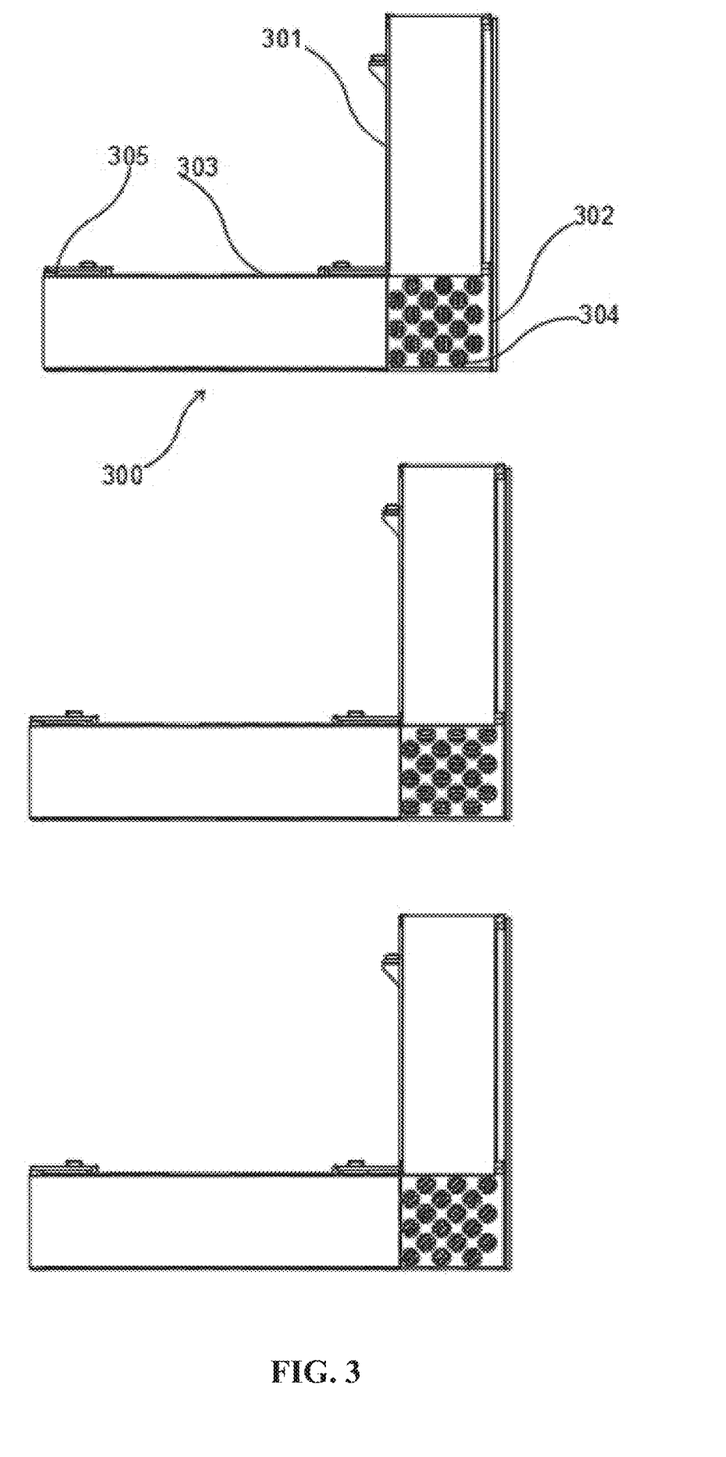
FIG. 3 illustrates a top plan view of the stacking conveyor

The innovation disclosed herein, in one aspect thereof, is shown in FIGS. 1 and 2, and comprises an autonomous loading/unloading device (1) that comprises a transportable platform (100) that is driven into a storage area, shipping container, trailer, warehouse or distribution center, loads or unloads parcels within the confines of the designated area. The parcels are transported to and from the device on a transport conveyor. Said device comprises:

Stacking conveyor (300), adjustable in height, as shown in FIG. 3, comprises 3 sections:

Conveyor (1st conveyor) (301) associated with transport conveyor. This conveyor travels in the same direction as the transport conveyor.

Conveyor (2nd conveyor) (302) with or without diverting wheels (304) with adjustable angles which is the corner conveyor between the 1st conveyor (301) and the 3rd conveyor (303) (see next) which allows for the uninterrupted movement of the parcels between the 1st conveyor (301) and the 3rd conveyor (303). Also, may be used to rotate or re-position direction of parcels passing through.

Figure 7:
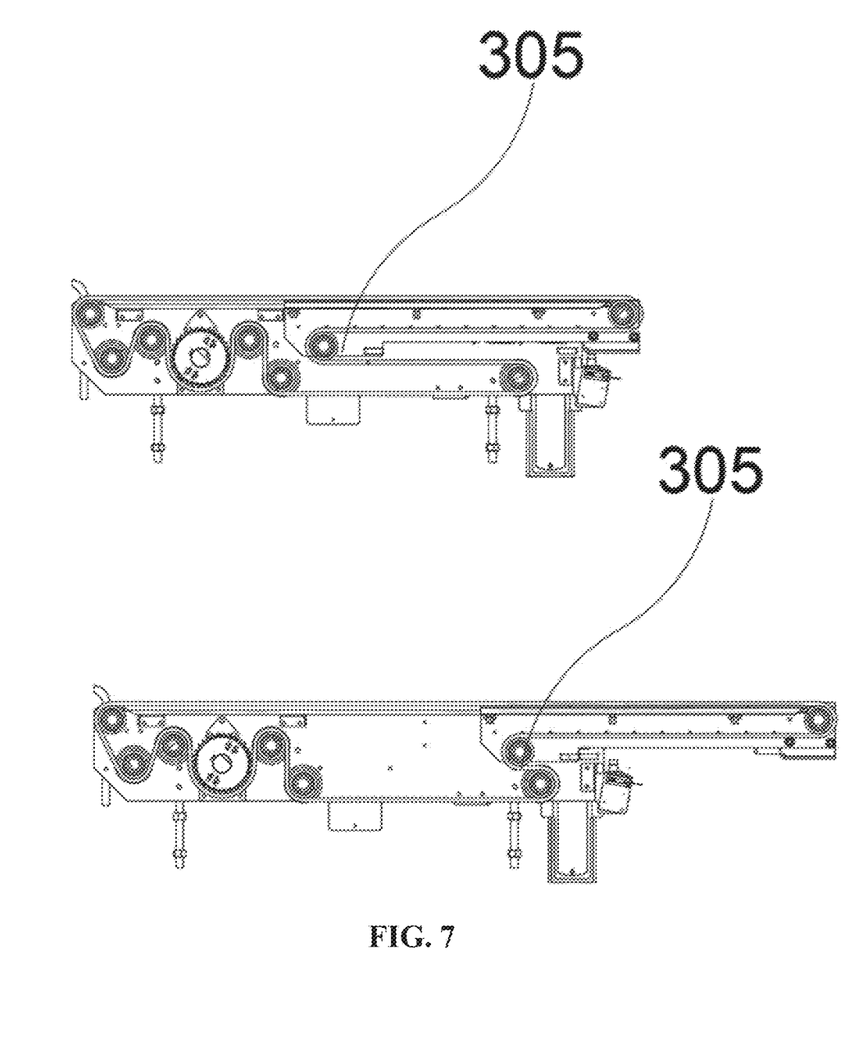
FIG. 7 illustrates the compiling conveyor with the pulley retractable system

Compiling conveyor (3rd conveyor) (303) which is perpendicular in space to the $1^{st}$ conveyor (301) and has the ability to compress and extend in size due to a pulley retractable system (305) as shown in FIG. 7 so as to compile the parcels and push them against each other prior to loading or to match the width of the designated area. This feature is novel regarding the prior art and makes the device space efficient.

The stacking conveyor (300) is configured to form and/or break up at least one row of parcels.

During the loading cycle, the diverting wheels (304) of the 2nd conveyor (302) are at a 90° angle so the parcels will have a 90° transfer which will be time efficient for the row assembly. During the unloading cycle, the diverting wheels (304) are at a 45° so the parcels will have a curved trajectory allowing the unloading process to be faster.

A pusher system (500), shown in FIG. 6A to 6E, sits on top of the 3rd conveyor (303) and comprises two attached segments as follows:

One section (501) sits right on top of the 3rd conveyor (303) and like the 3rd conveyor (303), can extend and compress in length to adjust its size to the 3rd conveyor (303) as it extends and compresses in size due to a scissor expansion system (504) along its length.

A second smaller section (502) which is the length of the 2nd conveyor and will assume one of two main positions:

At the beginning of the loading, the smaller section (502) is in the closed position at an angle of 90 degrees to the first longer section (501). In this position, parcels can travel between the 3 different conveyors unobstructed.

Once the number of parcels to fill a row is reached, the smaller section (502) rotates horizontally to the open position to reach a 180 degree or flat position with the longer section.

Together, both sections then move forward to push the compiled row of parcels onto the loading arm.

In this way, the row to be loaded can be the width of the 2nd and 3rd conveyors (302 and 303) which may be adjusted to meet the width of the loading container or designated space.

Both sections, the first longer section (501) and the second smaller section (502), have at their ends suction grippers (503) with an extended part to allow the grabbing of the parcels during the cycle.

A support column holds the stacking conveyor (300) and the pusher system (500) at an adjustably fixed height.

In one embodiment, the support column is mounted on a transportable platform (100) giving the device the ability to be moved left or right and forward or backward.

A loading arm (200) moveable in a plurality of directions, at least one being horizontal and the second being vertical. It may be a robotic arm or a mechanical arm but at least an automated moving arm. Said arm is mounted on a movement system to traverse the length of the transportable platform.

The arm (200) comprises a plurality of elements which form a sort of platform onto which the pusher will push the row of parcels. These elements may vary in length but be no less than the largest parcel to in the row to be stacked when loading or unloading.

The arm (200) moves horizontally so as to position the said elements which form a sort of platform to the level and position of the 3rd conveyor (303), and can extend to as far as the back of the container being loaded or unloaded so as to stack a row of parcels in the requisite position.

The arm (200) moves vertically so as to load or unload a row of parcels starting from the bottom of the container or cargo space all the way to the highest row for stacking the parcels in a most efficient and optimal manner.

Figure 4:
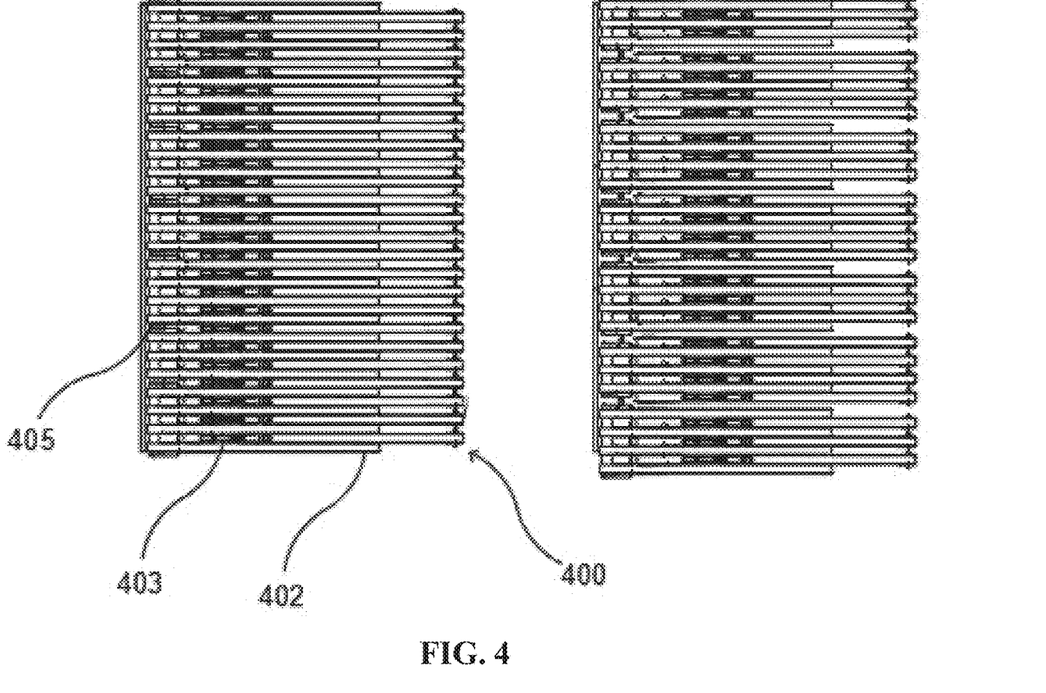
FIG. 4 illustrates a top plan view of the platform
Figure 5:
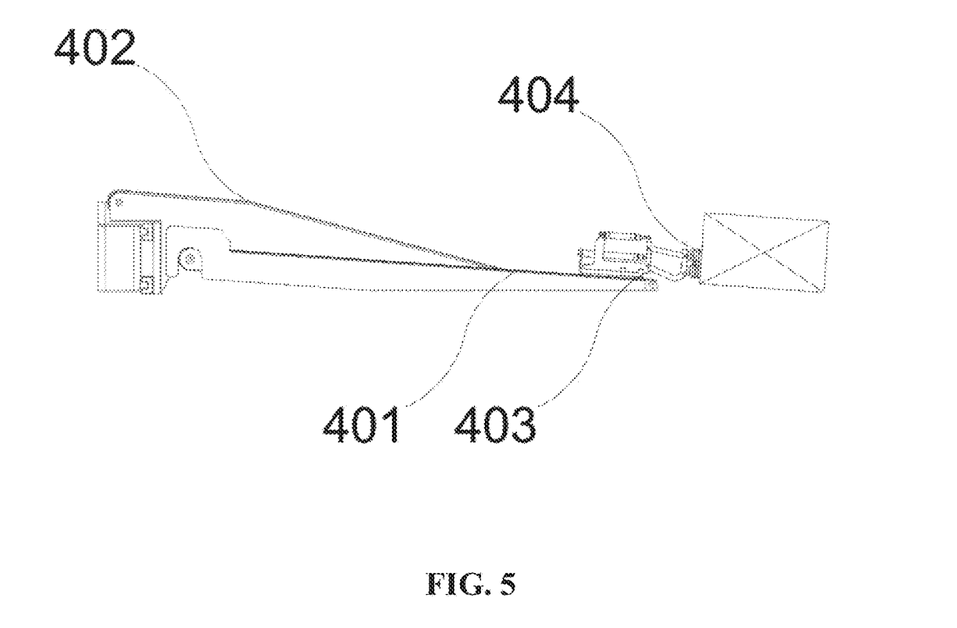
FIG. 5 illustrates a side perspective view of the platform
Figure 6A:
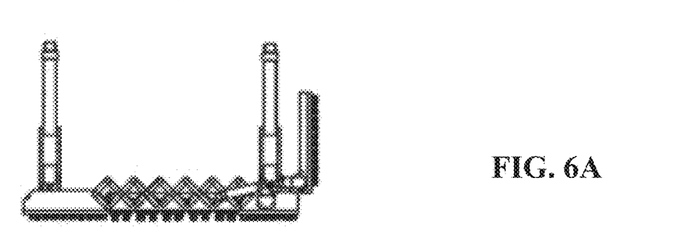
FIG. 6A to 6E illustrate a top plan view of the row pusher system
Figure 6B:
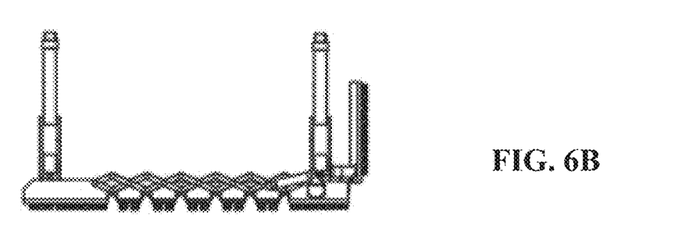
Figure 6C:
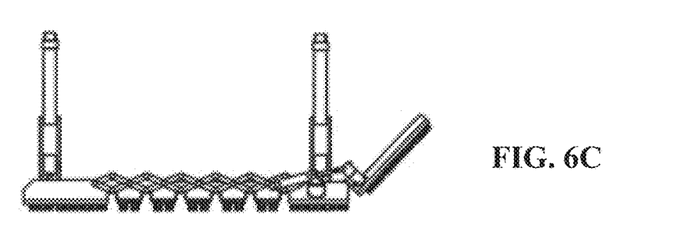
Figure 6D:
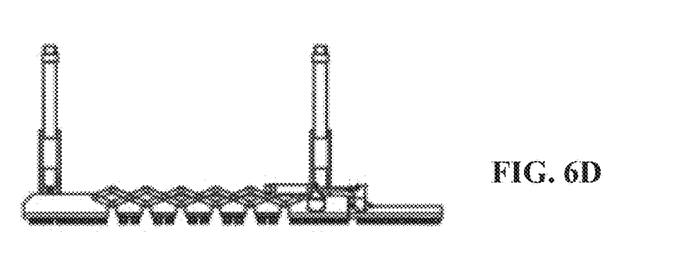
Figure 6E:
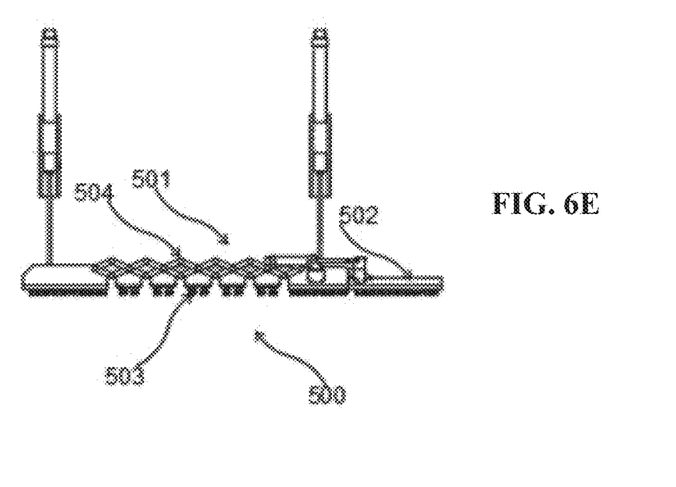

The elements which form a sort of platform (400), as shown in FIG. 4, comprise a plurality of parallel conveyors (401, 402), pushers (403) and vacuum lifters (404) between them to further push the compiled row to its predefined row and column in the stacking as shown in FIG. 5. The parallel conveyors move the row of parcels horizontally to position the row of parcels in front of the grippers which resume the pushing of the row to its intended final position.

Figure 8:
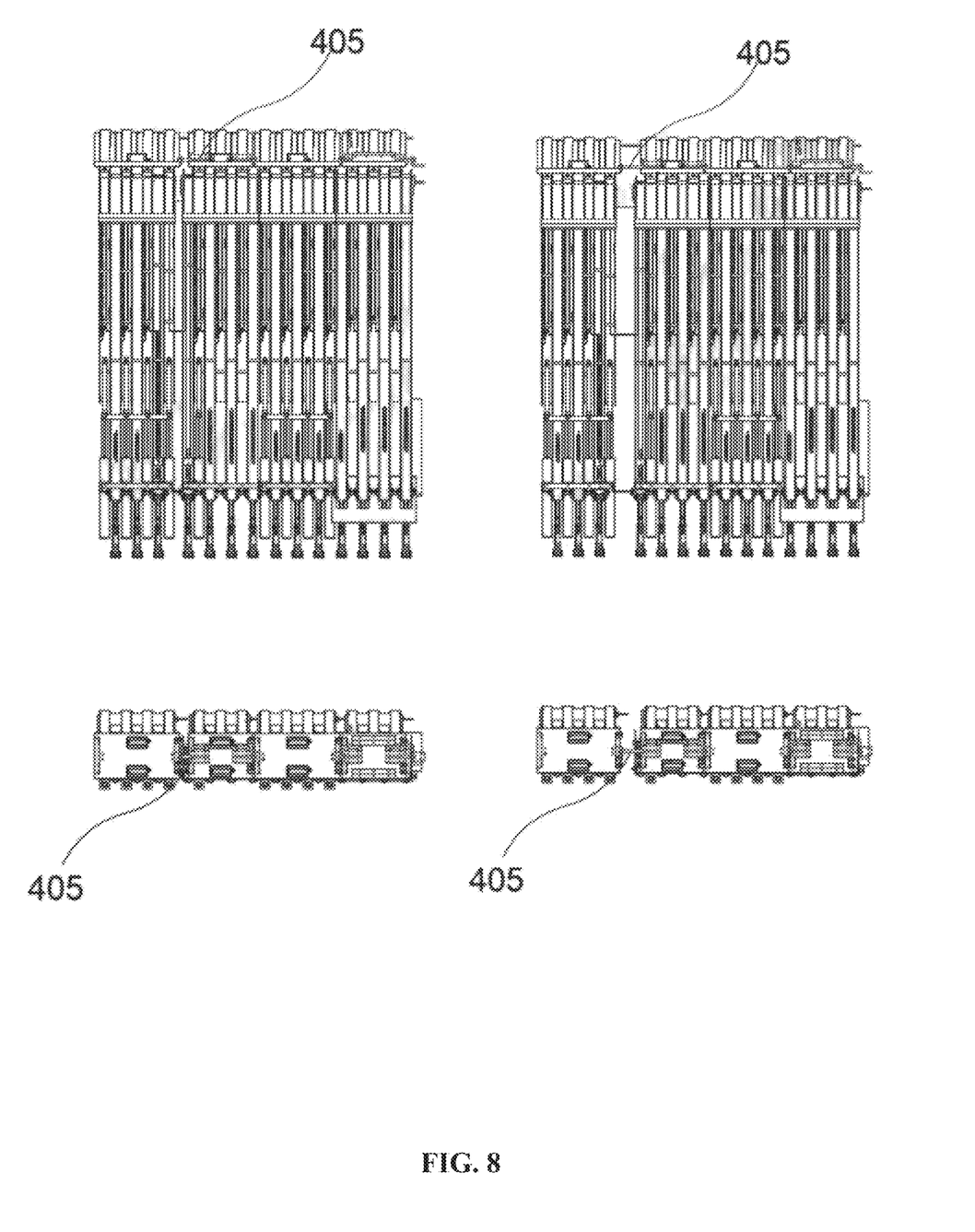
FIG. 8 illustrates the mechanism which allows the platform to expand and retract

The platform (400) can extend and compress in width to adjust its size so it extends and compresses in size due to a pneumatic adjusting pitching system (405) along its length as shown in FIG. 8.

The platform (400) can be tilted at the level of its connection with the arm (200) to match the tilting of the designated area.

The vacuum lifters (404) comprise suction elements at the end which allows them to securely grab the row of parcels, and push them evenly. The suction elements also assist in the unloading, whereby a row of parcels is lifted and held onto under the suction effect of the suction elements and pulled backwards towards the parallel conveyors which then move the row of parcels onto the 3rd conveyor (303) to be unloaded.

During loading, each vacuum lifters (404) independently extends to align the backs of the parcels. During unloading, each vacuum lifters (404) independently extends to grab and pull all the parcels in a row simultaneously.

The vacuum lifters (404) and suctions may incline or rotate in a vertical arc as needed to provide for a better grip and positioning of the grip with respect to each row, since not all rows will have homogenous sized parcels.

A sensing system (600) comprising a plurality of sensors allowing the following readings:

The width of the designated area so the 3rd conveyor extends so its length matches the width of the designated area.

The dimensions and tilting of the designated area before the device is placed. Same sensing system (600) will determine the arm movement to avoid collision with the designated area's boundaries.

During the unloading cycle, the position of the parcels in the designated area so the device would be centered.

In one embodiment, the device according to the invention may comprise functions as a loading device, transferring parcels from outside the designated area, aligning them in rows and stacking these rows inside the designated area. In another embodiment, the device according to the invention may comprise function an unloading machine, de-staking rows of parcels from inside the designated area, breaking up rows of parcels and transferring them outside the designated area. The device can operate selectively in both modes.

In both modes, loading and unloading, two cycles can be performed simultaneously. In one embodiment, during a loading cycle, while the cargo is being stacked in the designated area, another set of parcels is being transported on the conveyors in order to be stacked after.

In a preferred embodiment of the invention, a sorting system sorts the parcels before going through the transport conveyor to create a loading pattern with the designated area's highest fill-rate. Preferably, the transport conveyor contains an orientation device to orient the parcels before going through the stacking conveyor.

In an embodiment, we consider a loading cycle. The parcels arrive on the 1st conveyor (301), perform a 90° transfer on the 2nd conveyor (302) and are stacked on the 3rd conveyor (303).

The pusher system (500) narrows down its width by shortening the 3rd conveyor (303) as explained in FIG. 6 and herein above. This width narrowing will eliminate any space between the parcels making this invention a space efficient one.

The pusher system (500), using the first longer section (501) and the second smaller section (502), pushes the row of parcels transferring them to the delivery system.

While the arm (200) that is holding the delivery system transports the platform of parallel conveyors (400) to the predefined loading location, a new row of parcels is being transported on the transport conveyor towards the stacking conveyor (300) making the device and the process time efficient since two cycles are performed simultaneously.

Once on the platform of parallel conveyors (400), the row of parcels is conveyed towards the end of the platform (400)

through the series of superimposed parallel conveyors. Between each two parallel conveyors of one level (401, 402), there is a pusher (403) and a vacuum lifters (404) mounted on another level of parallel conveyors.

The pushers (403) and vacuum lifters (404), located adjacent to the first set of parallel conveyors, will meet the parcel at the end of the first set of parallel conveyors, and push them out of the platform (400) towards their final position.

The parcels having different dimensions and width, the vacuum lifters (404) extend to push the parcels so that the back sides of all parcels are aligned.

In another embodiment, we consider the device performing an unloading cycle, the arm (200) will transport the stacking conveyor (300) to a predefined location where a row of parcels is ready to be unloaded. The platform is then placed adjacently to the row of parcels.

The pushers (403) advance to the tip of the platform (400) to grab the parcels via the vacuum lifters (404) located at their end.

The pushers (403) and vacuum lifters (404) advance then towards the parcels. Since the parcels may have different dimensions and may be put in multiple orientations inside a row, the row of parcels may not be aligned, so the extended part of the vacuum lifters (404) compensates for that without damaging the parcels.

All the vacuum lifters (404) retreat their extended parts so all the front sides of the parcels are realigned.

The vacuum lifters (404) lift the parcels form one side due to the swinging attachment so the transfer to the delivery system is smooth and no damage is done to the parcels.

The pushers (403) and vacuum lifters (404) transfer the row of parcels to the series of parallel conveyors on the platform (400) and release the parcels. The pushers (403) and vacuum lifters (404) then retrieve to their location parallel to the set of parallel conveyors. The platform retracts its width in order to squeeze the parcels together. The parcels then travel the length of the platform (400). The arm (200) transfers the platform (400) adjacently to the 2nd and 3rd conveyor (302 and 303).

The suction grippers (503) hold the parcels. The pusher system (600) then retracts transferring the parcels into the 3rd conveyor (303). The 3rd conveyor (303) narrows its width eliminating the spaces between the parcels.

The second smaller section (502) of the pusher system (500) returns to the closed position at an angle of 90 degrees to the first longer section (501) so the parcels can leave towards the transport conveyor. The adjustable angles of the diverting wheels (304) in the 2nd conveyor (302) are at a 45° angle so the parcels will leave the following a curve which allows a faster disassembly of the row of parcels. The parcels on the stacking conveyor exit directly.

Meanwhile the arm (200) transports the platform (400) to pick the next row of parcels.

In an embodiment, the device according to the invention may perform the loading or unloading of a total row of parcels by dividing it into a plurality of smaller segments and performing the cycles accordingly.

In a further embodiment, the platform (400) might be able to carry a plurality of rows of parcels in order to load or unload them adjacently.

The foregoing description of an embodiment has been presented for purposes of illustration and description. It is to be understood that the disclosed embodiments are merely exemplary of the invention, which may be embodied in various forms. The disclose embodiments serve merely as a basis for the claims and as a representative basis for teaching one skilled in the art to variously employ the present invention in virtually any appropriately detailed structure. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose. Accordingly, it will be understood that the appended claims are intended to cover all such modifications and embodiments, which come within the spirit and scope of the present invention.

What is claimed is:

1. A device for loading and unloading parcels comprising:
    a plurality of conveyors (300), wherein a first conveyor (301) moves parcels between said first conveyor (301) and a second conveyor (302) and vice versa, and said second conveyor (302) moves said parcels onto a third conveyor (303) and vice versa;
    a pusher system (500) comprising a fixed section (501) and a rotating section (502) with a plurality of suction grippers (503) at one extremity of both sections;
    a movable arm (200) for supporting a platform (400) holding a plurality of parallel conveyors (401, 402), pushers (403) and a plurality of vacuum lifters (404);
    a sensing system (600); and
    wherein the second conveyor (302) comprises diverting wheels (304) for rotating the parcels;
    wherein the third conveyor (303) comprises a pulley retractable system (305) which allows the third conveyor (303) to expand and retract in size;
    wherein the movable arm (200) and elements of the movable arm (200) operate independently of the said plurality of conveyors (300); and
    wherein the platform (400) comprises a pneumatic adjustable pitching system (405) which allows the platform (400) to expand and retract in width.

2. The device of claim 1 wherein said plurality of pushers (403) and vacuum lifters (404) move forward or backward to push or pull a compiled row of parcels onto or from the parallel superimposed conveyors (401, 402).

3. The device according to claim 1, wherein the third conveyor (303) retracts in size to squeeze the parcels together or expands to match the size of the designated area.

4. The device according to claim 1, wherein the suction grippers (503) grab the parcels and move them forward or backward.

5. The device according to claim 1, wherein the movable arm (200) further comprises a plurality of parallel conveyors (401, 402) and a plurality of vacuum lifters (404) in between said parallel conveyors (401, 402), and wherein said vacuum lifters (404) assist the push or pull of at least one row of parcels along the superimposed conveyors to or from a designated location.

6. The device according to claim 1, wherein the sensing system (600) comprises a plurality of sensors and said sensors determine the final location of the movable arm (200) and parallel conveyors (401, 402).

7. The device according to claim 1, wherein said movable arm (200) moves in a plurality of directions including horizontally and vertically and forward and backwards.

8. The device according to claim 1, wherein the pusher system (502) is configured to rotate rotating part of the pusher system (502) to match the width of the third conveyor (303) or the second and third conveyors combined.

* * * * *